US 6,639,374 B2

United States Patent
Shimoyama

(10) Patent No.: US 6,639,374 B2
(45) Date of Patent: Oct. 28, 2003

(54) METHOD AND DEVICE FOR CONTROLLING DC SERVOMOTOR FOR DRIVING ROTATING LOAD

(75) Inventor: Akira Shimoyama, Numazu (JP)

(73) Assignee: Kokusan Denki Co., Ltd., Shizuoka-ken (JP)

(*) Notice: Subject to any disclaimer, the term of this patent is extended or adjusted under 35 U.S.C. 154(b) by 0 days.

(21) Appl. No.: 10/090,562

(22) Filed: Mar. 4, 2002

(65) Prior Publication Data
US 2002/0125847 A1 Sep. 12, 2002

(30) Foreign Application Priority Data
Mar. 6, 2001 (JP) .......................... 2001-061578
Jan. 31, 2002 (JP) .......................... 2002-022833

(51) Int. Cl.[7] .............................................. G05B 11/01
(52) U.S. Cl. .................... 318/560; 318/603; 318/599; 318/632; 318/446; 318/663; 388/811
(58) Field of Search ................. 318/599, 603, 318/560, 632, 446, 663; 388/811, 829, 912

(56) References Cited

U.S. PATENT DOCUMENTS

| 4,132,941 A | * | 1/1979 | Sousek et al. .............. 318/663 |
| 5,705,907 A | | 1/1998 | Miyamori et al. |
| 5,836,353 A | * | 11/1998 | Van Steenwyk ....... 137/624.15 |

FOREIGN PATENT DOCUMENTS

JP 10-298679 5/2000

* cited by examiner

*Primary Examiner*—Karen Masih
(74) *Attorney, Agent, or Firm*—Pearne & Gordon LLP

(57) ABSTRACT

A method of controlling a DC servomotor for driving a driven member coupled by a wire to an operation member of a valve, wherein, at the start of a control, the motor is driven first to rotate the operation shaft of the valve to a limit position after the motor stops, a driving current of the motor is gradually reduced to return slowly the driven member by a tension of the wire, and a position of the driven member when the driving current of the motor becomes zero is stored as a final stop position, thereafter, a rotational range of the driven member is limited to the range between these final stop positions when the position of the driven member is controlled to coincide with a target position.

5 Claims, 5 Drawing Sheets

METHOD AND DEVICE FOR CONTROLLING DC SERVOMOTOR FOR DRIVING ROTATING LOAD

TECHNICAL FIELD OF THE INVENTION

This present invention relates to a method and a device for controlling a DC servomotor for driving a rotating load such as a valve.

BACKGROUND OF THE INVENTION

When a rotating load such as a valve is driven by a motor, a rotating load driving device using a DC servomotor as a driving source is often used.

A valve being controlled to open and close according to various control conditions is often used in order to adjust characteristics of various machines and control operations of the machines. For example, in a two-cycle combustion engine, a valve for adjusting timing of exhaust in order to improve output characteristics of the engine and to purify exhaust gas of the engine, a valve for opening and closing a cavity connected to an exhaust pipe to adjust a resonance frequency of the exhaust pipe in order to improve exhaust efficiency and a valve for adjusting air-intake timing are provided as needed. These valves are controlled according to various control conditions such as a rotational speed and an opening degree of a throttle valve.

As a device for driving a valve provided in a combustion engine, a device is used which is provided with a DC servomotor, a driven member to be driven by the DC servomotor, an operation member attached to an operation shaft of the valve in order to rotationally operate the valve and a wire for coupling the driven member and the operation member.

In this kind of driving device, with the rotation of the driven member to be driven by the motor, the operation member is rotated while being pulled by the wire, and the operation shaft of the valve is rotationally operated by the rotation of the operation member.

If the valve is driven by such a driving device, a driving current is supplied to the motor at a duty ratio of 100% at the start of control to cause the valve to carry out an operation of moving a valve body of the valve from one limit position (e.g., fully closed position) to the other limit position (e.g., fully opened position) and an operation of moving the valve body from the other limit position (e.g., fully opened position) to one limit position (e.g., fully closed position). In this way, self-cleaning of the valve is performed. Foreign matters such as carbon and dusts adhered to a movable portion of the valve are removed by this self-cleaning operation to allow the valve to move smoothly in subsequent control operations.

In addition, when this self-cleaning operation is performed, a stop position of the driven member at the point when the valve body of the valve stops by reaching the fully closed position and a stop position of the driven member at the point when the valve body of the valve stops by reaching the fully opened position are detected and stored as a fully-opened-side final stop position and a fully-closed-side final stop position of the driven member, respectively.

During the operation of the combustion engine, a position of the driven member attached to the output shaft of the motor is detected by a position detector such as a potentiometer. Then, a duty ratio of a driving current of the motor is controlled such that a deviation between the detected current position of the driven member and a target position of the driven member corresponding to an optimal position of the valve body of the valve, which is determined by various control conditions such as a rotational speed of the engine and an opening degree of the throttle valve, becomes zero. In this way, the position of the valve body of the valve (hereinafter referred to simply as the position of the valve) is coincided with the optimal position.

As described above, the valve driving device is comprised such that the driven member that is driven by the motor and the operation member attached to the operation shaft of the valve are coupled by a wire and the valve is driven while the operation member is pulled via the wire with the rotation of the driven member. In the valve driving device, when a driving current with a duty ratio of 100% is supplied to the motor and the operation shaft of the valve is driven toward the limit position (the fully opened position or the fully closed position), even after the operation shaft of the valve reaches the limit position, the driven member is displaced to a certain degree by the extension of the wire due to a large output torque of the motor caused by the driving current with a duty ratio of 100%. Thus, the final stop position of the driven member and the limit position of the operation shaft of the valve cannot accurately correspond to each other. Therefore, in the conventional device, a position that is beyond the position of the driven member corresponding to the limit position of the operation shaft of the valve may be detected as the final stop position of the driven member.

However, during the operation of the engine, when the driven member is controlled to reach the final stop position with the target position of the driven member as the final stop position in order to displace the operation shaft of the valve to the limit position, it is not possible to always flow the driving current with a duty ratio of 100% in order to have good controllability. As the position of the driven member is approaching the final stop position, it is necessary to reduce the duty ratio of the driving current. Thus, when the operation shaft of the valve reaches the limit position and stops, the motor also stops. Therefore, if the final stop position of the driven member detected when the control is started is a position that is beyond a position corresponding to the limit position of the operation shaft of the valve, the motor stops and is locked in the state in which the driven member cannot be displaced to the final stop position. If the motor continues to be locked, since the driving current continues to flow into an armature coil while the motor is stopped, it is likely that a coil of the motor is burned and a switch element of a circuit for controlling the driving current of the motor is damaged. Thus, it is necessary to provide means for detecting that the motor is locked and immediately block the driving current of the motor when it is detected by this means that the motor is locked. However, since it requires a certain period of time to detect that the motor is locked, protection of the motor and protection of the circuit for controlling the motor cannot be accurately realized.

In addition, in the case in which the final stop position of the driven member is shifted from the position corresponding to the limit position of the operation shaft of the valve at the start of the control, if the driving current of the motor is blocked when the operation shaft of the valve reaches the limit position and the motor stops, the driven member may be pulled back by tension of the wire. If the driven member is pulled back in this way, since the operation shaft of the valve may also be pulled back from the limit position, the control for causing the operation shaft of the valve to reach the limit position cannot be accurately performed.

As described above, in the driving device in which the driven member attached to the motor side and the operation member attached to the valve side are coupled by the wire, it may be difficult to accurately correspond the final stop position of the driven member to the limit position of the operation member due to extension of the wire. Thus, the control for displacing the operation shaft of the valve to the limit position cannot be accurately performed.

Further, although a load of the driving device is assumed to be a valve in the above-mentioned example, the same problem occurs in the case in which a driven member to be driven by a DC servomotor and an operation member for operating a rotating load other than a valve are coupled by a wire to control the DC servomotor, thereby controlling a stop position of the load.

SUMMARY OF THE INVENTION

Accordingly, it is an object of the present invention to provide a control method and a control device for a DC servomotor for driving a load, which, when a driven member to be driven by a DC servomotor and an operation member for operating a load such as a valve are coupled by a wire to rotate the load, can accurately detect a final stop position of the driven member corresponding to a limit position of the load to control a position of the load accurately while preventing the situation in which power supply to the motor cannot be stopped and the motor to be excessively heated when the load reaches the limit position.

According to an aspect of the present invention, there is provided a method of controlling a DC servomotor of a rotating load driving device comprising: the DC servomotor for driving a rotating load; a driven member to be driven and rotated by the DC servomotor; an operation member attached to an operation shaft of a rotating load, a rotational range of which is mechanically limited; and a wire for coupling the operation member and the driven member, and rotating the operation member with the rotation of the driven member while pulling the operation member by the wire to rotate the rotating load. In the present invention, after carrying out a motor driving step of driving a motor such that a sufficiently large driving current is flown to the motor to rotate the rotating load toward a limit position; and a driving current attenuating step of gradually attenuating the driving current to be finally zero after the motor stops in the motor driving step, and detecting a rotational position of the driven member at the point when the driving current becomes zero in the driving current attenuating step as a final step position of the driven member, the method controls the driving current of the motor to bring a deviation between a target position of the driven member corresponding to a target position of the rotating load and a current position of the driven member to zero while keeping the position of the driven member not to be beyond the final stop position.

As described above, when a large current is flown to the motor to rotate the rotating load toward the limit position, the driven member stops in a position where a tension of the wire and a driving torque of the motor balance with each other after the rotating load reaches the limit position and stops. When the driving current is gradually attenuated in this state, the driven member is pulled back slowly by the tension of the wire and, when the driving current becomes zero, reaches an original final stop position corresponding to the limit position of the rotating load. Therefore, when comprised as described above, the method can accurately detect the final stop position of the driven member corresponding to the limit position of the rotating load and accurately carry out subsequent controls.

In addition, when comprised as described above, since it is possible to correspond the final stop position of the driven member to the limit position of the rotating load, the method can immediately detect that the driven member has reached the limit position to stop the motor when the rotating load has reached the limit position and stopped, and the method can prevent the motor from being excessively heated due to the delay in detecting that the motor has stopped.

According to another aspect of the present invention, there is provided a method of controlling a DC servomotor of a valve driving device comprising: the DC servomotor; a driven member to be driven by the DC servomotor and rotated in one direction and in the other direction following the rotation of the motor in one direction and in the other direction; an operation member attached to an operation shaft of a valve, a rotational range of which is mechanically limited such that the operation shaft rotates between a fully-closed-side limit position and a fully-opened-side limit position; and first and second wires provided so as to couple the driven member and the operation member, and rotating the operation shaft of the valve toward the fully-opened-side limit position while pulling the operation member by the first wire when the driven member rotates in one direction and rotates the operation shaft of the valve toward the fully-closed-side limit position while pulling the operation member by the second wire when the driven member rotates in the other direction. In the present invention, after carrying out a fully-opened-side final position detecting step for carrying out a first motor driving step of driving a motor such that a sufficiently large driving current is flown to the motor to rotate the operation shaft of the valve toward the fully-opened-side limit position; and a first driving current attenuating step of gradually attenuating the driving current to be finally zero after the motor stops in the first motor driving step, to detect a rotational position of the driven member at the point when the driving current becomes zero in the first driving current attenuating step as the fully-opened-side final stop position of the driven member and, a fully-closed-side final position detecting step for carrying out a second motor driving step of driving a motor such that a sufficiently large driving current is flown to the motor to rotate the operation shaft of the valve toward the fully-closed-side limit position; and a second driving current attenuating step of gradually attenuating the driving current to be finally zero after the motor stops in the second motor driving step, to detect a rotational position of the driven member at the point when the driving current becomes zero in the second driving current attenuating step as the fully-closed-side final stop position of the driven member, the method controls the driving current of the motor to bring a deviation between a target position of the driven member set between the fully-opened-side final stop position and the fully-closed-side final stop position and a current position of the driven member to zero.

The above-mentioned valve is, for example, a valve for adjusting a characteristic of a combustion engine such as an exhaust valve to be provided for adjusting exhaust timing of a two-cycle combustion engine and a valve for opening and closing a cavity connected to an exhaust pipe in order to adjust a resonance frequency of an exhaust pipe of a combustion engine.

According to another aspect of the present invention, a control device of a DC servomotor for driving a rotating load is provided, which comprises:

a driving mechanism that includes a DC servomotor; a driven member to be driven and rotated by the DC servomotor; an operation member attached to an operation shaft of a rotating load, a rotational range of which is mechanically limited; and a wire connecting the operation member and the driving member, and rotates the operation member while pulling the operation member by the wire following the rotation of the driving member to drive the rotating load;

final stop position detecting means for carrying out a motor driving step of driving a motor such that a sufficiently large driving current is flown to the motor to rotate the rotating load toward a limit position and a driving current attenuating step of gradually attenuating a driving current after the motor stops in the motor driving step to finally bring the driving current to zero to detect a rotational position of the driven member at the point when the driving current becomes zero in the driving current attenuating step as a final stop position of the driven member; and motor driving current controlling means for controlling a driving current of the motor to bring a deviation between a target position of the driven member corresponding to a target position of the rotating load and a current position of the driven member to zero while keeping the position of the driven member not to be beyond the final stop position.

According to yet another aspect of the present invention, a control device of a DC servomotor for driving a valve is provided, which comprises:

a driving mechanism that includes a DC servomotor; a driven member to be driven by the DC servomotor and rotated in one direction and in the other direction following the rotation of the motor in one direction and in the other direction; an operation member attached to an operation shaft of a valve, a rotational range of which is mechanically limited such that the operation shaft rotates between a fully-closed-side limit position and a fully-opened-side limit position; and first and second wires provided so as to couple the driven member and the operation member, and the valve driving mechanism rotates the operation shaft of the valve toward the fully-opened-side limit position while pulling the operation member by the first wire when the driven member rotates in one direction and rotates the operation shaft of the valve to toward the fully-closed-side limit position while pulling the operation member by the second wire when the driven member rotates in the other direction;

fully-opened-side final stop position detecting means for carrying out a first motor driving step of driving a motor such that a sufficiently large driving current is flown to the motor to rotate the operation shaft of the valve toward the fully-opened-side limit position and a first driving current attenuating step of gradually attenuating the driving current to be finally zero after the motor stops in the first motor driving step to detect a rotational position of the driven member at the point when the driving current becomes zero in the first driving current attenuating step as the fully-opened-side final stop position of the driven member;

fully-closed-side final stop position detecting means for carrying out a second motor driving step of driving a motor such that a sufficiently large driving current is flown to the motor to rotate the operation shaft of the valve toward the fully-closed-side limit position and a second driving current attenuating step of gradually attenuating the driving current to be finally zero after the motor stops in the second motor driving step to detect a rotational position of the driven member at the point when the driving current becomes zero in the second driving current attenuating step as the fully-closed-side final stop position of the driven member; and motor driving current controlling means for controlling the driving current of the motor to bring a deviation between a target position of the driven member set between the fully-opened-side final stop position and the fully-closed-side final stop position and a current position of the driven member to zero.

BRIEF DESCRIPTION OF THE DRAWINGS

The above and other objects and features of the invention will be apparent from the detailed description of the preferred embodiments of the invention, which are described and illustrated with reference to the accompanying drawings, in which.

DETAILED DESCRIPTION OF PREFERRED EMBODIMENTS

Preferred embodiments of the present invention will be hereinafter described with reference to the accompanying drawings.

Figure 1:
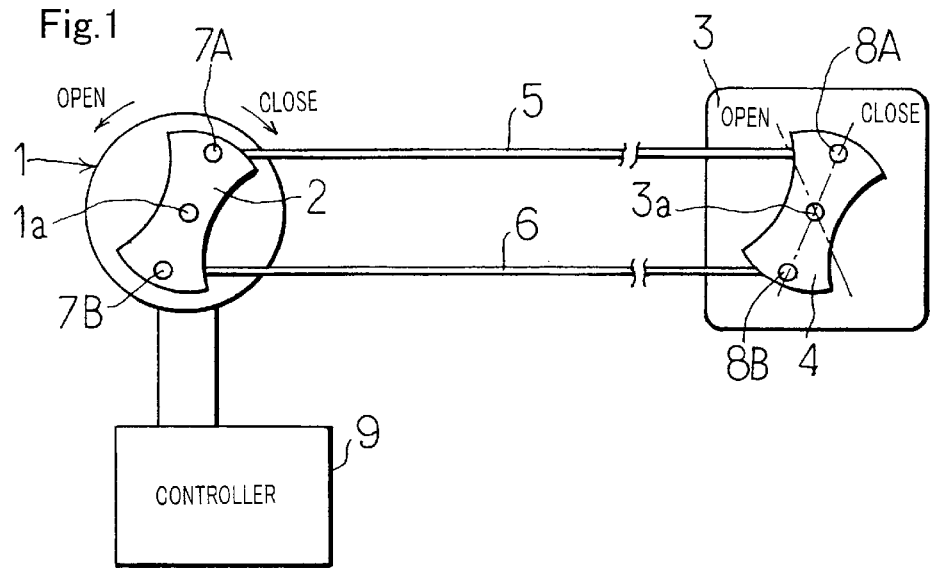
FIG. 1 is a schematic view showing an example of a construction of a valve driving device for driving a valve for adjusting a characteristic of a combustion engine as an example of a rotating load driving device using a DC servomotor to be controlled by a control method in accordance with the present invention.

FIG. 1 shows a valve driving device for opening and closing a valve of a combustion engine as an example of an application of a DC servomotor to be controlled by a method of the present invention. In FIG. 1, a reference numeral 1 denotes a DC servomotor provided with a speed reducer, 2 denotes a lever-like driven member that is attached to an output shaft (output shaft of the speed reducer) 1a of the DC servomotor 1 and rotated in one direction (the counterclockwise direction in the illustrated example) and the other direction (the clockwise direction in the illustrated example) following the rotation of the motor in one direction and the other direction, and 3 denotes a valve (rotating load) for adjusting a characteristic of the combustion engine.

The driven member 2 is comprised of a lever-like plate material and is arranged with the surface of the plate perpendicular with the axis line of the output shaft 1a of the motor 1. The central part of the driven member 2 in its longitudinal direction is fixed to the output shaft 1a of the motor 1.

The valve 3 is a valve for adjusting a characteristic of the combustion engine such as an exhaust valve provided for adjusting exhaust timing of a two-cycle combustion engine and a valve for opening and closing a cavity connected to an exhaust pipe of the combustion engine in order to adjust a resonance frequency of the exhaust pipe. The valve 3 has an operation shaft 3a that is rotated for operating a valve body and can bring the valve 3 to a fully opened state and a fully closed state by rotating the operation shaft 3a in one direction (the counterclockwise direction in the illustrated example) and the other direction (the clockwise direction).

A reference numeral 4 denotes an operation member that is attached to the operation shaft 3a of the valve 3 and rotated in one direction (the counterclockwise direction in the illustrated example) and the other direction (the clockwise direction), respectively, when the valve 3 is brought to the fully opened state and the fully closed state. The operation member 4 is comprised of a lever-like plate arranged with the surface of the plate perpendicular with the central axis line of the operation shaft 3a and its central part in the longitudinal direction is fixed to the operation shaft 3a.

A rotational range of the operation shaft 3a is mechanically regulated in the valve and/or a rotational range of the operation member 4 is mechanically regulated by a stopper or the like in order to limit a rotational range of the operation shaft 3a of the valve 3 between a limit position in the fully opened side (a rotational angle position of the operation shaft when the valve is in the fully opened state) and a fully-closed-side limit position (a rotational angle position of the operation shaft when the valve in the fully closed state). That is, the rotational ranges of the operation shaft 3a of the valve 3 and/or the operation member 4 are mechanically regulated by regulating means such as a stopper acting on the operation shaft 3a and/or regulating means such as a stopper acting on the operation member 4, respectively, such that the operation shaft 3a and/or the operation member 4 can rotate only between the fully-opened-side limit position and the fully-closed-side limit position.

The operation member 4 and the driven member 2 are coupled at their one ends and at their other ends in their respective longitudinal directions by a first wire 5 and a second wire 6 in the state in which they are arranged in parallel with each other.

The first wire 5 and the second wire 6 are arranged in parallel with each other. One ends of these wires are arranged in symmetrical positions with respect to the rotational central axis line of the driven member 2, respectively, and coupled to pins 7A and 7B fixed to the driven member 2. The other ends of the first wire 5 and the second wire 6 are arranged in symmetrical positions with respect to the rotational central axis line of the operation member 4, respectively, and coupled to pins 8A and 8B fixed to the operation member 4.

In the illustrated example, when the output axis (the output axis of the speed reducer in the illustrated example) 1a of the motor 1 rotates in one direction (the counterclockwise on the drawing), the driven member 2 rotates in one direction (counterclockwise direction). The operation member 4 is rotated in one direction while being pulled by the wire 5 following the rotation of the driven member 2 in one direction. Consequently, the operation shaft 3a of the valve 3 is rotated toward the fully-opened-side limit position. When the operation shaft 3a reaches the fully-opened-side limit position, the operation shaft 3a and the operation member 4 are stopped.

In addition, when the output shaft of the motor 1 rotates in the other direction (clockwise direction), the driven member 2 rotates in the clockwise direction, and the operation member 4 is rotated in the clockwise direction while being pulled by the first wire 6 following the rotation of the driven member. Consequently, the operation shaft 3a of the valve 3 is rotated toward the fully-closed-side limit position. When the operation shaft 3a of the valve 3 reaches the fully-closed-side limit position, the operation member 4 is stopped.

A reference numeral 9 denotes a controller for controlling the DC servomotor 1 using a microcomputer. The controller 9 controls a driving current given to the motor 1 so as to cause a position of the driven member 2 detected by a not-shown position detector attached to the rotation shaft (the output shaft 1a of the motor 1 in this example) of the driven member 2 to coincide with a target position corresponding to a target opening degree of a valve, which is defined according to various control conditions such as a rotational speed of an engine and an opening degree of a throttle valve.

The valve driving device as shown in FIG. 1 is often employed in a motorcycle or the like that is driven by a two-cycle combustion engine.

If a position of an exhaust valve or the like is controlled by using the valve driving device shown in FIG. 1, the valve driving device causes the valve to carry out a self-cleaning operation after a combustion engine starts in order to prevent a state in which the smooth movement of the valve is interrupted during the control by adhesion of carbon and dusts. In this self-cleaning operation, an operation for moving the operation shaft of the valve from the fully-closed-side limit position to the fully-opened-side limit position is carried out and, then, an operation for putting the operation shaft back to the fully-closed-side limit position is carried out, thereby removing carbon and dusts adhered to a movable portion of the valve. During the operation of the engine, the valve driving device controls a driving current to be given to the motor 1 such that the operation shaft of the valve 3 is positioned in an appropriate position between the fully-closed-side limit position and the fully-opened-side limit position according to various control conditions such as a rotational speed of the engine and an opening degree of the throttle valve.

In a valve driving device of this type, it is likely that the motor 1 is over heated if a driving current is flowing to the motor 1 in the state in which the operation shaft of the valve 3 is displaced to the fully-opened-side limit position or the fully-closed-side limit position. Thus, when the operation shaft of the valve 3 reaches the fully-opened-side limit position or the fully-closed-side limit position and stops, it is necessary to stop the supply of power to the motor 1.

Here, for reference, a conventional method of controlling a DC servomotor of a valve driving device of this type will be described. In the conventional method of controlling the DC servomotor 1 for driving the valve 3 by a microcomputer, positions of a driven member corresponding to the fully-closed-side limit position and the fully-opened-side limit position of the operation shaft of the valve 3, respectively, are set as a fully-closed-side final stop position and a fully-opened-side final stop position in advance and stored in a ROM. Then, a driving current of the DC servomotor is controlled so as to cause a rotational position of the driven member 2 detected by a position detector attached to the rotation shaft of the driven member 2 to coincide with a target position set in an angle range between the fully-closed-side final stop position and the fully-opened-side final stop position according to various control conditions, thereby causing the position of the operation shaft of the valve to coincide with the target position.

In this way, if the method is employed which sets the positions of the driven member 2 corresponding to the fully-closed-side limit position and the fully-opened-side limit position of the operation shaft of the valve 3, respectively, as the fully-closed-side final stop position and the fully-opened-side final stop position in advance and stores the positions in the ROM, the fully-closed-side limit position and the fully-opened-side limit position of the operation shaft of the valve and the fully-closed-side final stop position and the fully-opened-side final stop position of the driven member do not accurately correspond to each other due to unevenness of sizes of each portion of the valve driving device. As a result, control of the opening degree of the valve 3 cannot be carried out accurately.

In order to solve this problem, a control method has been proposed, which carries out a learning control for actually moving the operation shaft of the valve 3 to the fully-closed-side limit position and the fully-opened-side limit position, thereby recognizing final stop positions of the driven member 2 corresponding to the fully-closed-side limit position and the fully-opened-side limit position of the operation shaft of the valve 3, respectively, and thereafter regards the final stop positions recognized by the leaning control as the fully-closed-side final stop position and the fully-opened-side final stop position of the driven member 2 to control the rotational position of the driven member 2 in the range between these final stop positions and stop the motor when the driven member 2 reaches the final stop positions. If the valve 3 is driven by the DC servomotor, this learning control is usually executed when the self-cleaning operation of the valve is carried out.

If the learning control as described above can be performed correctly, even if a mechanical error, which becomes a factor of causing a control error, such as unevenness of sizes of each portion of the valve driving device exists in a control system, since the final stop positions of the driven member 2 corresponding to the fully-closed-side limit position and the fully-opened-side limit position of the operation shaft of the valve 3, respectively, can be accurately set, control of an opening degree of the valve 3 can be carried out appropriately by controlling a driving current of the motor 1 so as to detect a rotational position of the driven member and cause the detected rotational position to coincide with a target position.

In the conventional control method, if the above-mentioned leaning control is carried out, when carrying out the self-cleaning operation of the valve 3, the controller 9 supplies a driving current with a duty ratio of 100% to the motor 1 such that the operation shaft of the valve 3 is displaced from the fully-closed-side limit position (if the initial state of the valve is the fully closed state) to the fully-opened-side limit position. Then, the controller 9 reads an output of a position detector, which shows a stop position of the driven member at the time when the operation shaft of the valve reaches the fully-opened-side limit position and stops, in the microcomputer and causes the microcomputer to store the stop position in the RAM as the fully-opened-side final stop position. The controller 9 supplies a driving current with a duty ratio of 100% to the motor and causes the motor 1 to rotate in the reverse direction and displaces the operation shaft of the valve 3 toward the fully-closed-side limit position. Further, the controller reads an output of the position detector, which shows a stop position of the driven member at the time when the operation shaft of the valve reaches the fully-closed-side limit position and stops, in the microcomputer and causes the microcomputer to store the stop position in the RAM as the fully-closed-side final stop position. Thereafter, the controller 9 regards the fully-opened-side final stop position and the fully-closed-side final stop position, which are stored in the RAM in this way, as fully-opened-side final stop positions and the fully closed side of the driven member 2 corresponding to the fully-opened-side limit position and the fully-closed-side limit position of the operation shaft of the valve, respectively. Then, the controller 9 controls a driving current of the motor 1 to cause the stop position of the driven member 2 to coincide with a target position (corresponding to the target position of the operation shaft of the valve) set in the range between the fully-opened-side final stop position and the fully-closed-side final stop position.

However, as described above, if the driving current with a duty ratio of 100% is supplied to the motor 1 at the time of the self-cleaning and the final stop position of the driven member 2 corresponding to the limit position of the operation member 4 is detected, the final stop position of the driven member cannot be detected accurately as described below. Thus, the driving current of the motor cannot be blocked when the driven member reaches the final stop position, and the motor may be overheated and the valve may not be able to be brought to the fully opened state.

Figure 7:
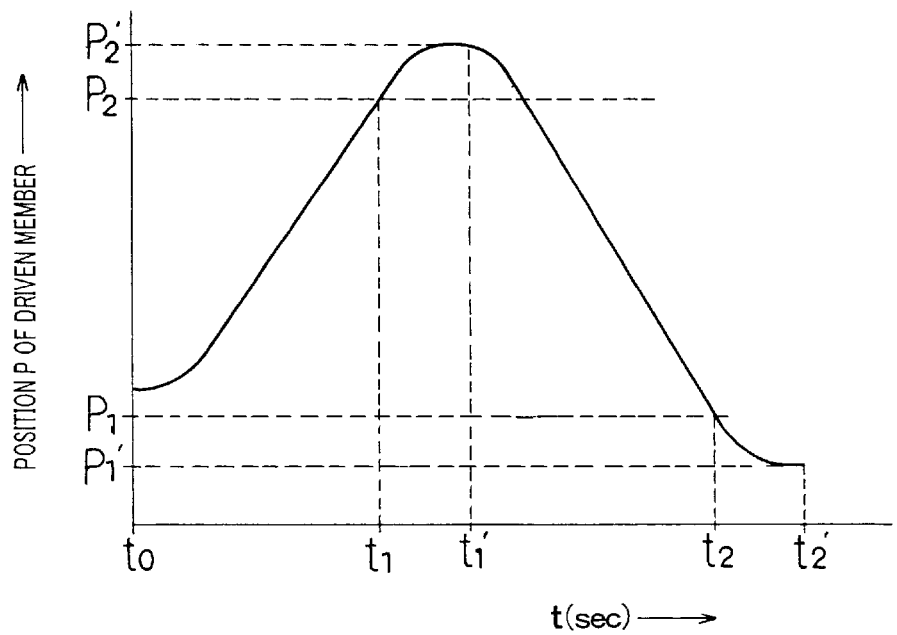
FIG. 7 is a chart showing a temporal change of a position of a driven member when self-cleaning of a valve and detection of a final stop position of the driven member are carried out by a conventional control method.

FIG. 7 shows a change of a position P of the driven member 2 at the time of self-cleaning with respect to time t in the case in which the final stop position of the driven member 2 is found as described above. In FIG. 7, reference character P1 shows a regular fully-closed-side final stop position of the driven member corresponding to the fully-closed-side limit position of the operation member and P2 shows a regular fully-opened-side final stop position of the driven member corresponding to the fully-opened-side limit position of the operation member.

In this example, the self-cleaning operation is started at time t0 and the driven member 2 starts rotation toward the regular fully-opened-side final stop position P2 at time t1. Although the driven member 2 reaches the regular fully-opened-side final stop position P2 at time t1, the driven member 2 cannot stop in this position due to extension of the wire 5 caused by a large driving torque generated by the motor, and stops when it reaches a position P2', where a driving torque of the motor 1 and a tension of the wire 5 balance each other, at time t1'. The controller 9 reads position P2' as the fully-opened-side final stop position of the driven member 2.

Subsequently, the rotational direction of the motor 1 is reversed to rotate the driven member 2 toward the fully-closed-side final stop position. Although the driven member 2 reaches the regular fully-closed-side final stop position P1 at time t2, the driven member 2 cannot stop in this position due to extension of the wire 6 and stops when it reaches a position P1' where a driving torque of the motor 1 and a tension of the wire 6 balance with each other at time t2'. The controller 9 reads the position P1' as the fully-closed-side final stop position of the driven member 2.

The controller fetches the fully-opened-side final stop position and the fully-closed-side final stop position of the driven member 2 in the manner described above and, then, controls a position of the driven member to coincide with the target position set between the fully-opened-side final stop position and the fully-closed-side final stop position by a control at stationary time.

Figure 8:
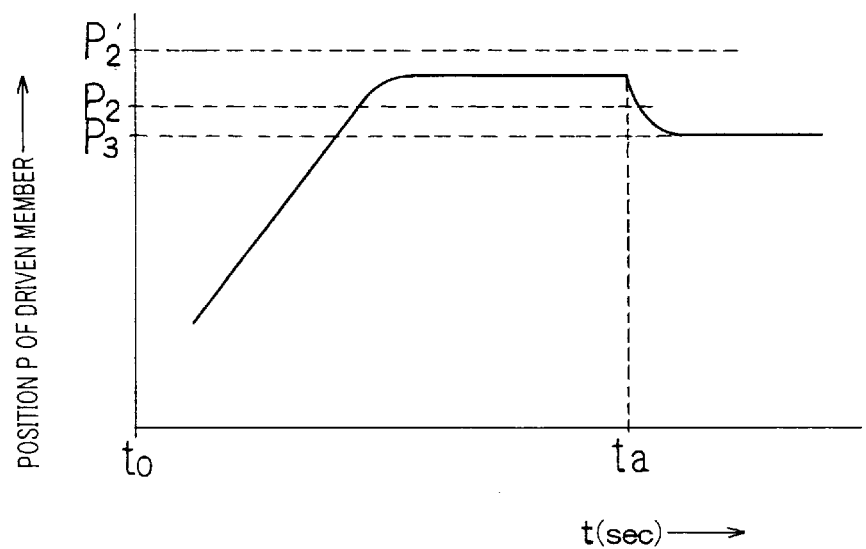
FIG. 8 is a chart showing an example of an operational characteristic when a control for displacing an operation shaft of a valve toward a fully-opened-side limit position using a final stop position of the fully opened side found by the conventional method is carried out.

Here, a case will be considered in which the target position of the driven member 2 is assumed to be the fully-opened-side final stop position in order to fully open the valve in the control at stationary time. The driven member 2 at this point rotates toward the fully-opened-side final stop position P2' detected at the time of self-cleaning as shown in FIG. 8. However, since a duty ratio of a driving current of the motor 1 is reduced to below 100% in a position close to the target position in the control at stationary time, the driven member 2 cannot reach the fully-opened-side final stop position P2' detected before. Thus, the driven member 2 stops in a position between the final stop position on the detected fully opened side P2' and the original fully-opened-side final stop position P2, and a driving current continues to flow to the motor 1 until the controller 9 detects the lock of the motor 1 at time ta. When the lock of the motor 1 is detected by the controller 9 at time ta, the supply of the driving current to the motor 1 stops. However, it is likely that an armature coil of the motor is burned if it takes long until the lock of the motor is detected. In addition, when the supply of the driving current to the motor 1 stops, since the driven member 2 is pulled back to the position P3 shown in FIG. 8 by the tension of the wire 5, the valve does not return to the fully opened state.

The present invention provides a method and a device for controlling a DC servomotor in which such a problem is prevented from occurring. In the control method of the present invention, after carrying out a fully-opened-side final position detecting step for carrying out a first motor driving step of driving the motor 1 such that a sufficiently large driving current is flown to the motor 1 to rotate the operation shaft of the valve 3 toward the fully-opened-side limit position; and a first driving current attenuating step of gradually attenuating the driving current to be finally zero after the motor 1 stops in the first motor driving step, to detect a rotational position of the driven member 2 at the point when the driving current becomes zero in the first driving current attenuating step as the fully-opened-side final stop position of the driven member and, a fully-closed-side final position detecting step for carrying out a second motor driving step of driving the motor 1 such that a sufficiently large driving current is flown to the motor 1 to rotate the operation shaft of the valve 3 toward the fully-closed-side limit position; and a second driving current attenuating step of gradually attenuating the driving current to be finally zero after the motor 1 stops in the second motor driving step, to detect a rotational position of the driven member 2 at the point when the driving current becomes zero in the second driving current attenuating step as the fully-closed-side final stop position of the driven member 2, the method controls the driving current of the motor to bring a deviation between a target position of the driven member set between the fully-opened-side final stop position and the fully-closed-side final stop position and a current position of the driven member to zero.

Figure 2:
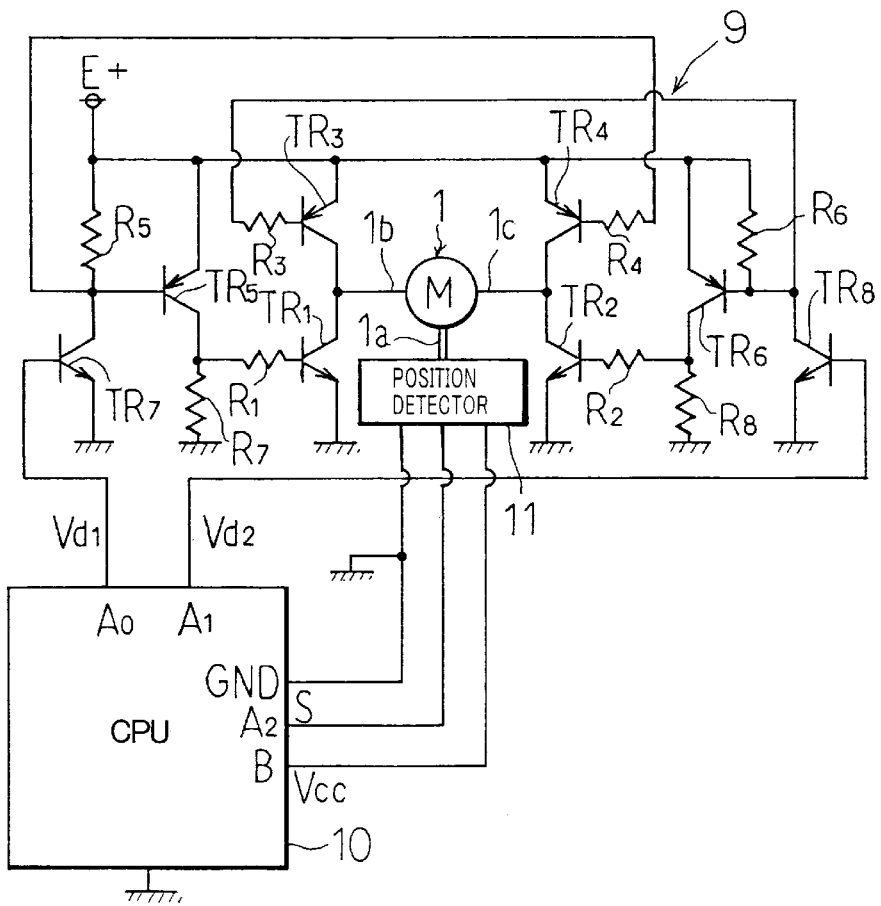
FIG. 2 is a circuit diagram showing an example of a construction of a controller to be used in the valve driving device of FIG. 1.

An example of a hardware construction of the controller 9 in case of carrying out such a control is shown in FIG. 2.

In FIG. 2, a reference numeral 10 denotes a microcomputer provided with ports A0 to A2, a ground terminal GND and a DC drive voltage output terminal B. A constant DC voltage Vcc, which is obtained between the ground terminal GND and the DC drive voltage output terminal B is applied to a power source terminal of a position detector 11 that is attached to the output shaft 1a of the servomotor 1 and outputs a position detection signal S indicating a rotational position of the driven member 2. The position detector 11 is comprised of, for example, a potentiometer, where the constant power source voltage Vcc is applied across both ends of the potentiometer, and generates a position detection signal (analog signal) S of a magnitude corresponding to a rotational position of the driven member 2. The position detection signal S to be obtained from the position detector 11 is inputted in the port A2 of the microcomputer 10.

The microcomputer 10 executes a predetermined program, thereby generating a forward rotation driving signal Vd1 and a backward rotation driving signal Vd2 from the ports A0 and A1, respectively. These driving signals are signals that are subject to PWM modulation (pulse width modulation) so as to be intermittent at a duty ratio corresponding to a magnitude (average value) of a driving current to be given to the motor 1 when the motor 1 is rotated forward and rotated backward.

In order to have a driving current to be supplied to the motor 1 to be turned on and off and a polarity of the driving current to be switched, NPN transistors TR1 and TR2 whose emitters are grounded and PNP transistors TR3 and TR4 whose collectors are connected to collectors of the transistors TR1 and TR2 and whose emitters are commonly connected are provided, and a common connection point of the collectors of the transistors TR1 and TR3 and a common connection point of the collectors of the transistors TR2 and TR4 are connected to power source terminals 1b and 1c of the motor 1, respectively.

Collectors of PNP transistors TR5 and TR6 are connected to the bases of the transistor TR1 and TR2 through resistances R1 and R2, respectively, and emitters of the transistors TR5 and TR6 are commonly connected to the emitters of the transistors TR3 and TR4. In addition, a collector of a transistor TR7 whose emitter is grounded is connected to the base of the transistor TR5 and a collector of an NPN transistor TR8 whose emitter is grounded is connected to the base of the transistor TR6. The base of the transistor TR3 is connected to the base of the transistor TR6 through the resistance R3 and the base of the transistor TR4 is connected to the base of the transistor TR5 through the resistance R4. Further, a resistance R5 is connected across emitter and a base of the transistor TR5 and a resistance R6 is connected across emitter and base of the transistor TR6, respectively, and resistances R7 and R8 are connected to a part between the collector and the ground of the transistor TR5 and a part between the collector and the ground of the transistor TR6, respectively. A common connection point of the emitters of the transistors TR3 to TR6 are connected to a power source terminal E+, which is connected to a positive pole terminal of a not-shown DC power source (e.g., battery) whose negative pole terminal is grounded.

Then, the base of the transistor TR7 is connected to the port A0 of the microcomputer 10 and the base of the transistor TR8 is connected to the port A1 of the microcomputer 10.

In the example shown in FIG. 2, a switching circuit for supplying a driving current of a predetermined polarity to the motor 1 is constituted by the transistors TR1 to TR4 which are connected so as to construct a bridge circuit. A switch control circuit is constituted by the transistors TR5 to TR8 and the resistances R1 to R8. The switch circuit controls the switching circuit for supplying a driving current so as to flow a driving current for forward rotation and a driving current for backward rotation to the motor 1 according to a forward rotation driving signal Vd1 and a backward rotation driving signal Vd2 that are generated by the microcomputer 10. The controller 9 is constituted by the switching circuit for supplying a driving current and the switch control circuit for controlling the switch circuit and the microcomputer 10.

In the controller 9 shown in FIG. 2, the microcomputer 10 arithmetically operates a target opening degree of the valve 3 according to various control conditions such as a rotational speed of the combustion engine and a degree of throttle opening and arithmetically operates a target position of the driven member 2 corresponding to the target opening degree. In the example shown in FIG. 1, the position of the valve 3 and the position of the driven member 2 correspond to each other with a ratio of one to one.

In addition, the microcomputer 10 detects a current position of the driven member 2 from the position detection signal S given from the position detector 11 attached to the output shaft of the motor 1 and arithmetically operates a deviation between the current position and the target position of the driven member 2. Then, the microprocessor 10 emits the forward rotation driving signal Vd1 and the backward rotation driving signal Vd2 whose pulse width is modulated at a duty ratio proportional to a magnitude of a driving current flown to the motor 1 so as to reduce this deviation to zero. The magnitude of the driving current flown to the motor 1 is set at a magnitude corresponding to the deviation between the current position and the target position of the driven member 2. The magnitude of the driving current is set such that the larger the deviation between the current position and the target position of the driven member the larger a value that magnitude of the driving current takes.

When displacing the valve 3 from the fully-closed-side limit position toward the fully-opened-side limit position at the time of learning control (at the time of self-cleaning of the valve 3), the target position of the driven member 2 is set in a position beyond a position corresponding to the fully-opened-side limit position of the operation member. In addition, when displacing the operation shaft of the valve from the fully-opened-side limit position toward the fully-closed-side limit position, the target position of the driven member 2 is set in a position beyond a position corresponding to the fully-closed-side limit position of the operation member. In this way, when the operation member is displaced toward the fully-closed-side limit position by setting the target position of the driven member in the position beyond the position corresponding to the fully-closed-side limit position of the operation member and when the operation member is rotated toward the fully opened position by setting the target position of the driven member in the position beyond the position corresponding to the fully-opened-side limit position of the operation member, the deviation between the current position and the target position of the driven member 2 becomes maximum and the driving current of the motor 1 takes a maximum value.

In the controller 9 shown in FIG. 2, when the microcomputer 10 does not generate the forward rotation driving signal Vd1 and the backward rotation driving signal Vd2, both the transistors TR7 and TR8 are in the blocked state. At this point, the transistors TR5 and TR6 are in the blocked state. When the transistors TR5 and TR6 are in the blocked state, a base current does not flow to the transistors TR1 and TR2. Thus, the transistors TR1 and TR2 are also in the blocked state. In addition, when the transistors TR7 and TR8 are in the blocked state, a base current does not flow to the transistors TR3 and TR4, these transistors are also in the blocked state.

When the microcomputer 10 emits the forward rotation driving signal Vd1 from the port A0, the transistor TR7 is brought into a conducting state. Thus, a base current flows to the transistor TR5 and the transistor TR5 is brought into a conducting state. Therefore, a base current is given to the transistor TR1 through the transistor TR5 and the transistor TR1 is brought into a conducting state. In addition, since a base current flows to the transistor TR4 by the transistor TR7 becoming conductive, the transistor TR4 is brought into a conducting state. Therefore, at this point, an armature current flows in one direction to the motor 1 from a not-shown DC power source through the part between the emitter and the collector of the transistor TR4, the armature coil of the motor 1 and the part between the collector and the emitter of the transistor TR1, and the motor 1 rotates in the forward direction (one direction). Consequently, the driven member 2 rotates in one direction (counterclockwise direction in FIG. 1) and the operation shaft of the valve 3 rotates toward the fully-opened-side limit position. When an opening degree of the valve 3 reaches the target opening degree, the generation of the forward rotation driving signal Vd1 stops. Thus, the transistor TR7 is brought into a blocked state, whereby the transistors TR5, TR1 and TR4 are brought into a blocked state, and the motor 1 stops.

When the microcomputer 10 emits the backward rotation driving signal Vd2 from the port A1, since the transistor TR8 is brought into a conducting state, a base current flows to the transistor TR6, and the transistor TR6 is brought into a conducting state. At this point, since a base current is given to the transistor TR2 through the transistor TR6, the transistor TR2 is brought into a conducting state. In addition, since a base current flows to the transistor TR3 by the transistor TR8 becoming conductive, the transistor TR3 is brought into a conducting state. Therefore, at this point, an armature current flows in the opposite direction of the above-described armature current to the motor 1 from a not-shown DC power source through the part between the emitter and the collector of the transistor TR3, the armature coil of the motor 1 and the part between the collector and the emitter of the transistor TR2, and the motor 1 rotates in the backward direction (the other direction). Consequently, the driven member 2 rotates in the other direction (clockwise direction in FIG. 1) and the operation shaft of the valve 3 rotates toward the fully-closed-side limit position. When an opening degree of the valve 3 reaches the target opening degree, the generation of the backward rotation driving signal Vd2 stops. Thus, the transistor TR8 is brought into a blocked state, whereby the transistors TR6, TR2 and TR3 are brought into a blocked state, and the motor 1 stops.

In the motor control method of the present invention, when self-cleaning of the valve 3 is performed at the time of starting control, a learning control is carries out, which comprises a fully-opened-side final stop position detecting step of detecting a position of the driven member 2 at the time when the valve 3 reaches the fully-opened-side limit position and stops as the fully-opened-side final stop position of the driven member 2 and a fully-closed-side final stop position detecting step of detecting a position of the driven member 2 at the time when the valve 3 reaches the fully-closed-side limit position and stops as the fully-closed-side final stop position of the driven member 2. Thereafter, according to various control conditions, a driving current of the motor 1 is controlled so as to reduce a deviation between a target position (corresponding to a target opening degree of the valve), which is set in the range between the fully-opened-side final stop position and the fully-closed-side final stop position, and a current position of the driven member 2 detected by the position detector 11 to zero.

In the control method in accordance with the present invention, in the above-mentioned step of detecting the fully-opened-side final stop position, a first motor driving step of driving a motor such that a sufficiently large driving current is flown to the motor to rotate the operation shaft of the valve toward the fully-opened-side limit position and a first driving current attenuating step of gradually attenuating the driving current to be finally zero after detecting that the motor stops in the first motor driving step are sequentially carried out to detect a rotational position of the driven member at the point when the driving current becomes zero in the first driving current attenuating step as the fully-opened-side final stop position of the driven member.

In addition, in the step of detecting the fully-closed-side final stop position, a second motor driving step of driving a motor such that a sufficiently large driving current is flown to the motor to rotate the operation shaft of the valve toward the fully-closed-side limit position and a second driving current attenuating step of gradually attenuating the driving current to be finally zero after the motor stops in the second motor driving step are sequentially carried out to detect a rotational position of the driven member at the point when the driving current becomes zero in the second driving current attenuating step as the fully-closed-side final stop position of the driven member.

Figure 3:
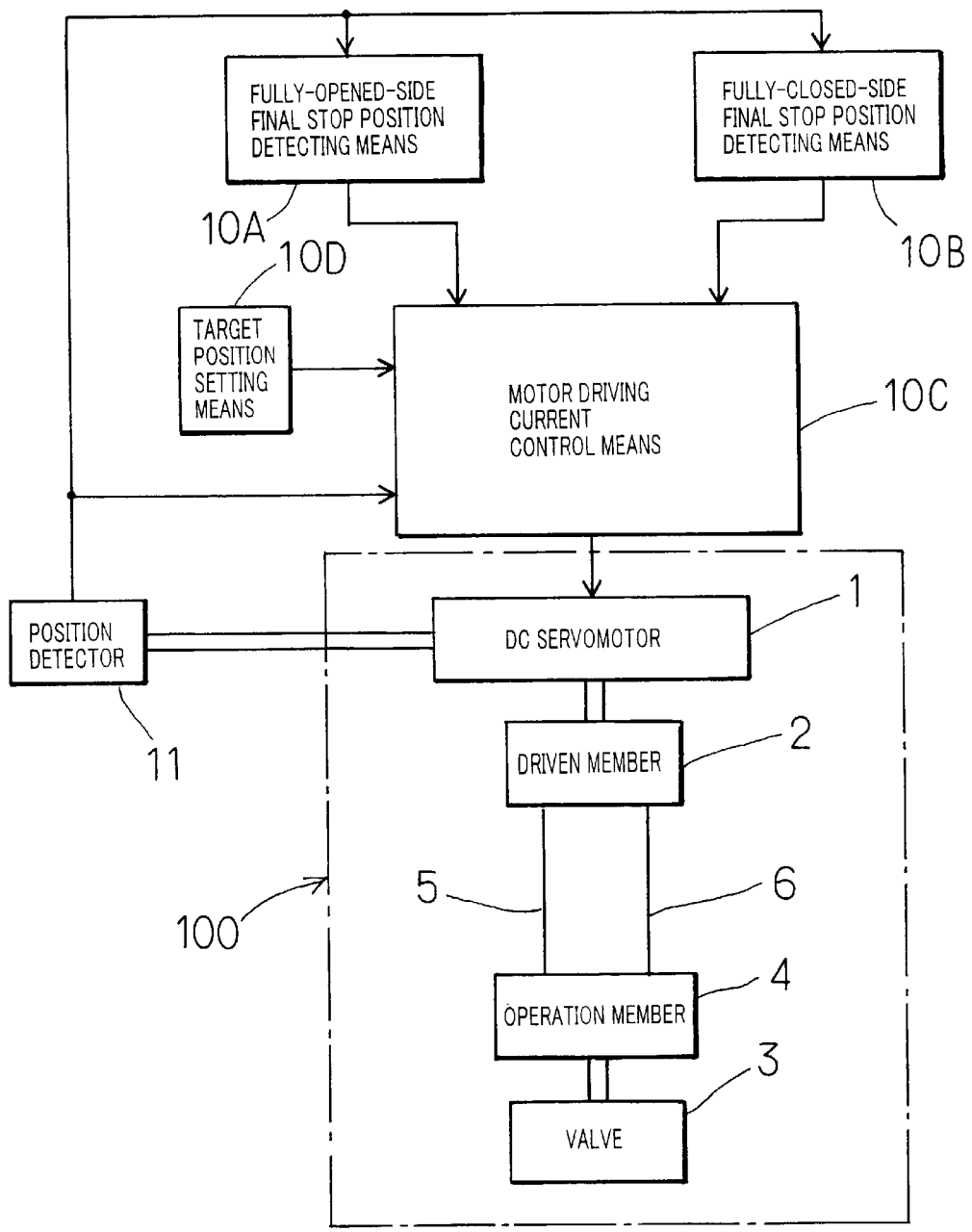
FIG. 3 is a block diagram showing a relation between final stop position detecting means and motor driving current controlling means and a driving mechanism that are provided in the controller to be used in the valve driving device of FIG. 1.

The control device of the present invention for implementing the above-described control method is comprised as shown in FIG. 3. In FIG. 3, a reference numeral 100 denotes a valve driving mechanism, which is provided with the DC servomotor 1, the driven member 2 that is driven by the DC servomotor and rotated in one direction and the other direction following rotation of the motor in one direction and the other direction, the control member 4 attached to the operation shaft of the valve 3 whose rotational range is mechanically limited such that it rotates between a fully-closed-side limit position and a fully-opened-side limit position, and the first and second wires 5 and 6 that are provided so as to couple the driven member and the operation member. In this valve driving mechanism, the operation shaft of the valve 3 is rotated toward the fully-opened-side limit position while pulling the operation member 4 by the first wire 5 when the driven member 2 rotates in one direction, and the operation shaft of the valve 3 is rotated toward the fully-closed-side limit position while pulling the operation member by the second wire 6 when the driven member 2 rotates in the other direction.

In FIG. 3, a reference numeral 10A denotes means for detecting a fully-opened-side final stop position, which is comprised to carry out a first motor driving step of driving a motor such that a sufficiently large driving current is flown to the motor to rotate the operation shaft of the valve 3 toward the fully-opened-side limit position and a first driving current attenuating step of gradually attenuating the driving current to be finally zero after the motor stops in the first motor driving step to detect a rotational position of the driven member, which is detected by the position detector 11, at the point when the driving current becomes zero in the first driving current attenuating step as the fully-opened-side final stop position of the driven member.

In addition, a reference numeral 10B denotes means for detecting a fully-closed-side final stop position, which is comprised to carry out a second motor driving step of driving the motor 1 such that a sufficiently large driving current is flown to the motor 1 to rotate the operation shaft of the valve 3 toward the fully-closed-side limit position and a second driving current attenuating step of gradually attenuating the driving current to be finally zero after the motor stops in the second motor driving step to detect a rotational position of the driven member, which is detected by the position detector 11 at the point, when the driving current becomes zero in the second driving current attenuating step as the fully-closed-side final stop position of the driven member.

A reference numeral 10C denotes means for controlling a motor driving current, which controls a driving current of a motor so as to reduce a deviation between a target position of the driven member 2 set by target position setting means 10D and a current position of the driven member 2 detected by the position detector 11 to zero.

The target position setting means 10D is means for setting a target position according to various control conditions such as a rotational speed of the engine and an opening degree of a throttle valve. The target position is set between a fully-opened-side final stop position and a fully-closed-side final stop position that are detected by the fully-opened-side final stop position detecting means 10A and the fully-closed-side final stop position detecting means 10B, respectively.

In FIG. 3, the fully-opened-side final stop position detecting means 10A, the fully-closed-side final stop position detecting means 10B, the motor driving current controlling means 10C and the target position setting means 10D are comprised by executing a predetermined program by the microcomputer.

Figure 4:
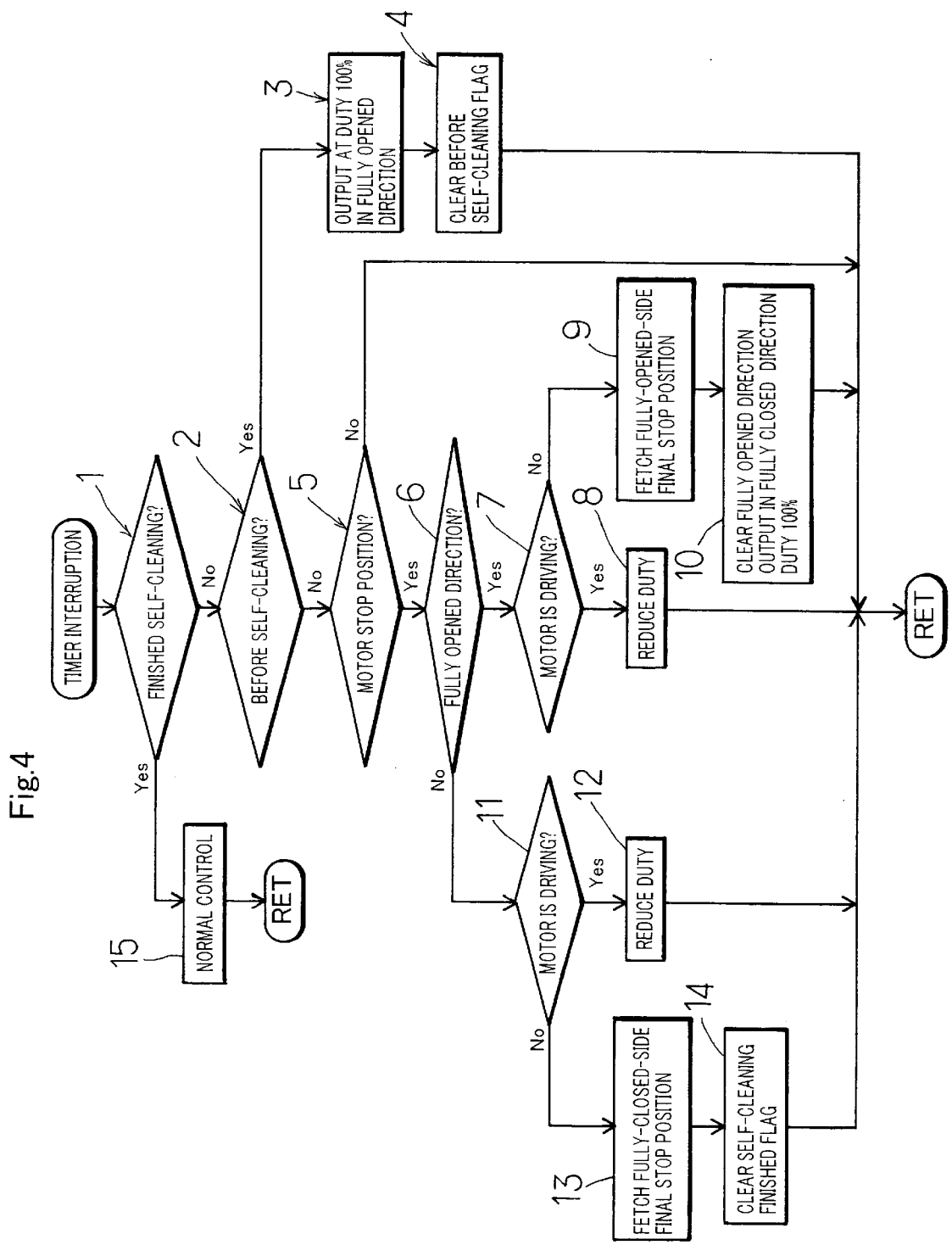
FIG. 4 is a flow chart showing an algorithm of an interrupt routine of a program that is executed for each fixed time by a microcomputer to be used in the controller shown in FIG. 2.

The microcomputer 10 executes timer interruption shown in FIG. 4 every time a timer provided in the microcomputer 10 measures a fixed time in order to comprise the above-mentioned control mans 10A to 10C. An output of the position detector 11 is given to the microcomputer 10 in the form of an analog signal, which is converted to a digital signal of eight bits by an A/D converter provided in the microcomputer 10. In addition, the microcomputer outputs a target position of the driven member 2 as a digital signal of eight bits.

When the timer interruption shown in FIG. 4 is started, it is determined whether or not a self-cleaning process is completed by checking whether or not a flag indicating that the self-cleaning is finished (whether it is 1 or not) in step 1 is set.

The self-cleaning process is a process for displacing the operation member 4 from the fully-opened-side limit position to the fully-closed-side limit position by reversing a polarity of a driving current of the motor 1 after displacing the operation member 4 from the fully-closed-side limit position to the fully-opened-side limit position by giving a driving current in one direction to the motor 1.

When it is determined in step 1 that the self-cleaning is not completed, the processing shifts to step 2, where it is checked whether or not a flag indicating that it is before the self-cleaning is set, whereby it is determined whether or not the self-cleaning has already been started. As a result, when it is determined that the self-cleaning has not been started, the processing shifts to step 3, where a fully opened direction flag indicating that a rotational direction of the motor is assumed to be a fully opened direction (a rotational direction when the operation shaft of the valve is displaced toward the fully-opened-side limit position) is set and, at the same time, a target value defining a target position on the side of the fully-opened-side final stop position of the driven member 2 is increased to maximum to output a driving current for rotating the operation member 4 in the fully opened direction with its duty ratio as 100%. A target position of the driven member at this point is set with enough allowance such that the target position is a position beyond a normal stop position of the driven member at the time when the valve has reached the fully opened position even if the length of the wires 5 and 6 is maximum.

Consequently, the motor 1 is rotated in the direction of fully opening the valve 3, the driven member 2 is rotated in the counterclockwise direction in FIG. 1, and the operation member 4 is rotated in the counterclockwise direction while pulling the operation member 4 by the wire 5. Subsequently, the processing shifts to step 4, where, after cleaning the flag showing that it is before the self-cleaning, returns to the main routine.

Next, when the timer interruption is executed, since it is determined in step 2 that it is not before the self-cleaning (the self-cleaning is being performed), the processing shifts to step 5, where it is determined whether or not the motor is stopped. As a result of this determination, if it is determined that the motor is not stopped, no action is taken and the processing returns to the main routine.

The operation member 4 stops when it reaches the fully-opened-side limit position. After the operation member 4 reaches the fully-opened-side limit position and stops, the motor 1 stops when an output torque of the motor 1 and a tension of the wire 5 balance with each other. When it is determined in step 5 that the motor 1 has stopped, step 6 is subsequently carried out to check whether or not the fully opened direction flag indicating that the rotational direction of the motor is the fully opened direction is set, whereby it is determined whether or not the rotational direction of the motor 1 to that point is the fully opened direction. As a result, when it is determined that the rotational direction of the motor is the fully opened direction, the processing shifts to step 7, where it is determined whether or not a driving current is supplied to the motor. When it is determined that a driving current is supplied to the motor, the processing shifts to step 8, where a duty ratio of the driving current of the motor is gradually attenuated. An attenuation rate of the duty ratio at that time is set, for example, so as to reduce the duty ratio by 20% for each period of a driving current of a PWM waveform. When the driving current of the motor is gradually reduced in this way, the driven member 2 is gradually pulled back by a tension of the wire 5 and stops where the tension of the wire 5 becomes zero. When it is detected in step 7 that the motor has stopped, the processing shifts to step 8, where a position of the driven member 2 at that point is read in the microcomputer 10 as a fully-opened-side final stop position. Thereafter, the fully opened direction flag is cleared in step 10, and a driving current with a duty ratio of 100% is given to the motor 1 in order to rotate the motor in a direction of fully closing the valve.

In this way, the driven member 2 is rotated in the clockwise direction in FIG. 1, and the operation member 3 is rotated in the clockwise direction while being pulled by the wire 6. After the operation member 3 reaches the fully-closed-side limit position and stops, the motor 1 stops when a tension of the wire 6 and a driving torque of the motor 1 balance with each other.

When the motor rotates in the direction of fully closing the valve and stops, its stoppage is detected in step 5. Then, since it is determined in step 6 that the fully opened flag is not set, the step 11 is carried out to determine whether or not the motor is driven. Since the motor 1 is currently being driven, step 12 is subsequently carried out to gradually reduce a duty ratio of a driving current of the motor 1. An attenuation rate of the duty ratio at that time is set in the same manner as described above.

When the driving current of the motor is gradually reduced in this way, the driven member 2 is gradually pulled back by a tension of the wire 6 and stops where the tension of the wire 6 becomes zero. When it is detected in step 11 that the motor has stopped, the processing shifts to step 13, where a position of the driven member 2 at that point is read in the microcomputer as a fully-closed-side final stop position. Subsequently, the processing shifts to step 14, where the flag indicating that the self-cleaning is finished is set, and returns to the main routine.

When it is determined in step 1 that the self-cleaning has finished, the processing shifts to step 15, where the normal control is carried out.

If the interrupt routine is executed according to the algorithm shown in FIG. 4, the means for detecting a fully-opened-side final stop position is comprised by steps 6 to 10, and the means for detecting a fully-closed-side final stop position is comprised by steps 6 and step 11 to 14. In addition, the motor driving current controlling means is constituted by step 15. The motor driving current control means is means for controlling a driving current supplied to the motor so as to reduce a deviation between a target position, which is an object of control, and a limit position to zero. A program, which the microcomputer executes in order to realize this control means, may be comprised in accordance with a publicly-known algorithm.

Figure 5:
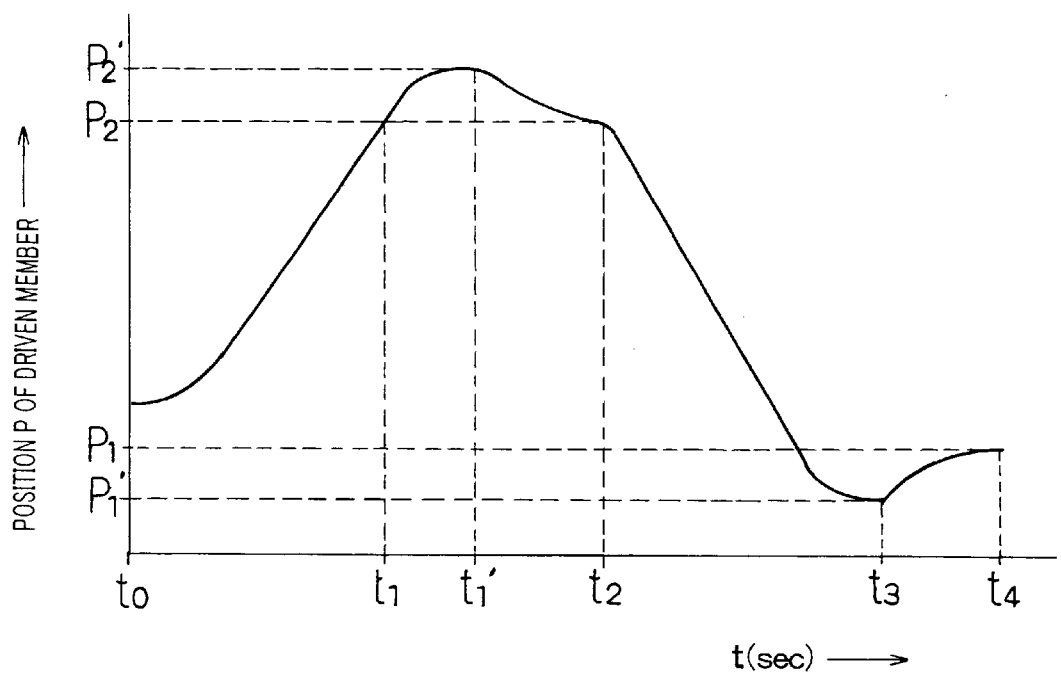
FIG. 5 is a timing chart showing a temporal change of a position of a driven member when self-cleaning of a valve and detection of a final stop position of the driven member are carried out by the control method of the present invention.

FIG. 5 shows an operation in performing the self-cleaning in the control method of the present invention and, at the same time, finding a fully-opened-side final stop position and a fully-closed-side final stop position of the driving member 2. The vertical axis of FIG. 5 shows a rotational angle position of the driven member 2 and the horizontal axis shows time t. In this example, the motor is driven in the fully opened direction in order to rotate the operation member 4 toward the fully-opened-side limit position with the duty ratio of a driving current of 100% at time t0. Although the driven member 2 reaches the regular fully-opened-side final stop position P2 corresponding to the fully-opened-side limit position of the operation member 4 at time t1, the motor cannot stop in this position and stops when the driven member reaches the position P2' where the driving torque of the motor and the tension of the wire 5 balance with each other at time t1'. When the motor stops, since the duty ratio of the driving current is gradually reduced, the driven member is pulled back from the position P2' by the tension of the wire and, when the driven member reaches the original fully-opened-side final stop position P2 at time t2, the driving current becomes zero and the motor stops. A driving current of a duty ratio of 100% is supplied to the motor 1 in order to rotate the driven member 2 toward the fully-closed-side final stop position at time t2. Consequently, the driven member rotates in the closing direction and stops when it reaches the position P1 where the driving torque of the motor and the tension of the wire 6 balance each other at time t3. Thereafter, since the duty ratio of the driving current gradually attenuates, the driven member is pulled back by the tension of the wire and stops when it reaches the normal fully-closed-side final stop position P1 and the driving current of the motor becomes zero at time t4.

Figure 6:
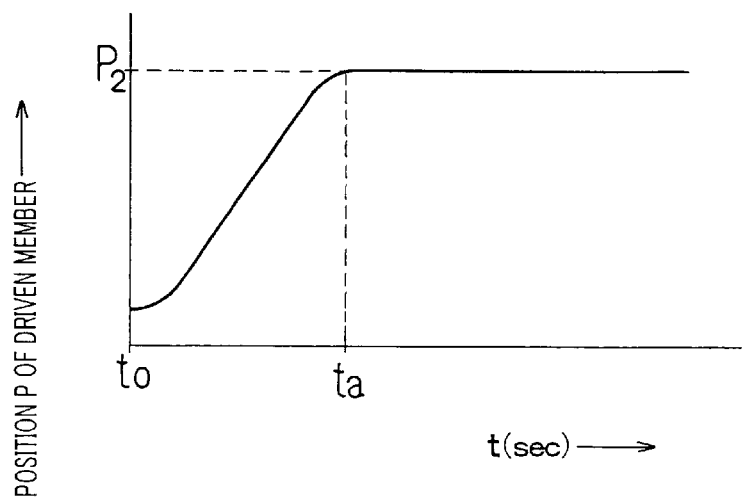
FIG. 6 is a chart showing an example of an operational characteristic when a control for displacing an operation shaft of a valve toward a fully-opened-side limit position using a final stop position of the fully opened side found by the method of the present invention is carried out.

FIG. 6 shows an operational characteristic when a control for displacing the operation shaft of the valve toward the fully-opened-side limit position is carried out using the fully-opened-side final stop position operated by the method of the present invention. According to the method of the present invention, since the fully-opened-side final stop position P2 of the driven member 2 and the fully-opened-side limit position of the operation shaft of the valve correspond to each other accurately, when the operation shaft of the valve reaches the fully-opened-side limit position at time ta, the driven member 2 also reaches the fully-opened-side final stop position P2 and the supply of the driving current to the motor is stopped. Therefore, the motor is not brought to the locked state and does not overheat.

As described above, according to the present invention, a sufficiently large driving current is flown to a motor so as to rotate a rotating load toward a limit position to rotate a driven member to a position where a tension of a wire and a driving torque of the motor balance each other and, then, a rotational angle position of the driven member at the time when the driving current is gradually reduced to be zero is taken in as a final stop position. Thus, it becomes possible to accurately detect the final stop position of the driven member corresponding to the limit position of an operation member for operating the rotating load to carry out the subsequent operations precisely.

In addition, since it is possible to make the final stop position of the driven member to accurately correspond to the limit position of the rotating load, it is possible to immediately detect that the driven member has reached the final stop position to stop the motor when the rotating load has reached the limit position and stopped, thereby preventing the motor from overheating due to delay of the detection.

Although some preferred embodiments of the invention have been described and illustrated with reference to the accompanying drawings, it will be understood by those skilled in the art that they are by way of example, and that various changes and modifications may be made without departing from the spirit and scope of the invention, which is defined only to the appended claims.

What is claimed is:

1. A method of controlling a DC servomotor of a rotating load driving device which comprises: a drive member driven and rotated by said DC servomotor: an operation member attached to an operation shaft of a rotating load, a rotational range of which is mechanically limited; and a wire coupling said operation member and said drive member; said rotating load being rotated with the rotation of said operation load which is pulled through said wire by said drive member and is rotated, when said drive member being driven by said servomotor, said method comprising: a motor driving step of driving said motor such that a sufficiently large driving current flows to said motor to rotate said rotating load toward a limit position: and a driving current attenuating step of gradually attenuating said driving current to be finally zero after said motor stops in said motor driving step, and said method controlling said driving current of said motor to bring a deviation between a target position of said drive member corresponding to a target position of said rotating load and a current position of said drive member to be zero, while keeping the position of said drive member not to be beyond said final stop position, after detecting a rotational position of said drive member at the point when said driving current becomes zero in said driving current attenuating step as a final stop position of said drive member.

2. A method of controlling a DC servomotor of a valve driving device which comprises: a drive member driven by said servomotor and rotated in one direction and in the other direction following the rotation of said servomotor in one direction and in the other direction: an operation member attached to an operation shaft of a valve, a rotational range of which is mechanically limited such that said operation shaft rotates between a fully-closed-side limit position and a fully-opened-side limit position: and first and second wires provided so as to couple said drive member and said operation member: said operation shaft of said valve being rotated toward said fully-opened-side limit position, while pulling said operation member by said first wire when said drive member rotates in one direction: and said operation shaft of said valve being rotated toward said fully-closed-side limit position, while pulling said operation member by said second wire when said drive member rotates in the other direction, said method comprising: a first motor driving step of driving said servomotor such that a sufficiently large driving current flows to said servomotor to rotate said rotation shaft of said valve toward said fully-opened-side limit position: and a first driving current attenuating step of gradually attenuating said driving current to be finally zero after said motor stops in said first motor driving step;

said method further comprising: a fully-opened-side final position detecting step to detect a rotational position of said drive member at the point when said driving current becomes zero in said first driving current attenuating step as said fully-opened-side final stop position of said drive member: a second motor driving step of driving said motor such that a sufficiently large driving current flows to said motor to rotate said operation shaft of said valve toward said fully-closed-side limit position: a second driving current attenuating step of gradually attenuating said driving current to be finally zero after said motor stops in said second motor driving step: and a fully-closed-side final position detecting step for detecting a rotational position of said drive member at the point when said driving current becomes zero in said second driving current attenuating step as said fully-closed-side final stop position of said drive member, and said method controlling said driving current of said motor to bring a deviation between a target position of said drive member set between said fully-opened-side final stop position and said fully-closed-side final stop position and a current position of said drive member to zero.

3. A method of controlling a DC servomotor of a valve driving device according to claim 2, wherein the method executes a cleaning of a valve by a movement of said valve in said first motor driving step and a movement of said valve in said second motor driving step.

4. A control device of a DC servomotor for driving a rotating load comprising:

a driving mechanism comprising a DC servomotor; a drive member to be driven and rotated by said DC servomotor; an operation member attached to an operation shaft of a rotating load, a rotational range of which is mechanically limited; and a wire connecting said operation member and said driving member, the driving mechanism rotating said operation member while pulling said operation member by said wire following the rotation of said driving member to drive said rotating load;

final stop position detecting means for carrying out a motor driving step of driving said motor such that a sufficiently large driving current flows to said motor to rotate said rotating load toward a limit position and a driving current attenuating step of gradually attenuating a driving current after said motor stops in said motor driving step to finally bring said driving current to zero to detect a rotational position of said driven member at the point when said driving current becomes zero in said driving current attenuating step as a final stop position of said drive member; and motor driving current controlling means for controlling a driving current of said motor to bring a deviation between a target position of said driven member corresponding to a target position of said rotating load and a current position of said drive member to zero while keeping the position of said drive member not to be beyond said final stop position.

5. A control device of a DC servomotor for driving a valve comprising:

a valve driving mechanism comprising a DC servomotor; a drive member to be driven by said DC servomotor and rotated in one direction and in the other direction following the rotation of said motor in one direction and in the other direction; an operation member attached to an operation shaft of a valve, a rotational range of which is mechanically limited such that said operation shaft rotates between a fully-closed-side limit position and a fully-opened-side limit position; and first and second wires provided so as to couple said drive member and said operation member, the valve driving mechanism rotating said operation shaft of said valve toward said fully-opened-side limit position while pulling said operation member by said first wire when said drive member rotates in one direction and rotating said operation shaft of said valve toward said fully-closed-side limit position while pulling said operation member by said second wire when said drive member rotates in the other direction;

fully-opened-side final stop position detecting means for carrying out a first motor driving step of driving a motor such that a sufficiently large driving current flows to said motor to rotate said operation shaft of said valve toward said fully-opened-side limit position and a first driving current attenuating step of gradually attenuating said driving current to be finally zero after said motor stops in said first motor driving step to detect a rotational position of said drive member at the point when said driving current becomes zero in said first driving current attenuating step as said fully-opened-side final stop position of said drive member;

fully-closed-side final stop position detecting means for carrying out a second motor driving step of driving a motor such that a sufficiently large driving current flows to said motor to rotate said operation shaft of said valve toward said fully-closed-side limit position and a second driving current attenuating step of gradually attenuating said driving current to be finally zero after said motor stops in said second motor driving step to detect a rotational position of said drive member at the point when said driving current becomes zero in said second driving current attenuating step as said fully-closed-side final stop position of said drive member; and motor driving current controlling means for controlling said driving current of said motor to bring a deviation between a target position of said driven member set between said fully-opened-side final stop position and said fully-closed-side final stop position and a current position of said driven drive member to zero.

* * * * *